(12) United States Patent
Chun (10) Patent No.: US 11,842,547 B2
(45) Date of Patent: Dec. 12, 2023

(54) APPARATUS FOR ASSISTING DRIVING OF HOST VEHICLE AND METHOD FOR ASSISTING DRIVING OF HOST VEHICLE

(71) Applicant: MANDO CORPORATION, Pyeongtaek-si (KR)

(72) Inventor: Semin Chun, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 206 days.

(21) Appl. No.: 17/242,950

(22) Filed: Apr. 28, 2021

(65) Prior Publication Data
US 2021/0354557 A1 Nov. 18, 2021

(30) Foreign Application Priority Data
Apr. 29, 2020 (KR) .................. 10-2020-0052047

(51) Int. Cl.
*G06V 20/58* (2022.01)
*B60K 31/00* (2006.01)
(Continued)

(52) U.S. Cl.
CPC ........ *G06V 20/582* (2022.01); *B60K 31/0058* (2013.01); *B60W 30/143* (2013.01);
(Continued)

(58) Field of Classification Search
CPC ............ G06V 20/582; B60K 31/0058; G60W 30/143; G60W 30/146; G60W 2420/42;
(Continued)

(56) References Cited

U.S. PATENT DOCUMENTS 9,035,796 B2 * 5/2015 Pilutti .............. G08G 1/096758
340/905
2004/0075582 A1 * 4/2004 Bergan ..................... G08G 1/01
340/936
(Continued)

FOREIGN PATENT DOCUMENTS

JP 2008-083816 A 4/2008
JP 2014-126962 A 7/2014
(Continued)

OTHER PUBLICATIONS

Office Action dated Jul. 25, 2023 for counterpart Chinese Patent Application No. 202110474644.4.

*Primary Examiner* — Dale W Hilgendorf
(74) *Attorney, Agent, or Firm* — Morgan, Lewis & Bockius LLP (57) ABSTRACT

An apparatus for assisting driving of a host vehicle includes: a camera mounted on the host vehicle and having a field of view outside of the host vehicle, the camera configured to acquire image data; and a controller configured to: process the image data, identify a speed limit of a road on which the host vehicle is driving and whether there is a speed enforcement for the host vehicle based on the image data; and provide information about the speed limit of the road to a driver of the host vehicle based on the speed limit of the road and whether there is the speed enforcement for the host vehicle. Thereby, the vehicle can be prevented from driving in excess of the speed limit.

14 Claims, 7 Drawing Sheets

(51) Int. Cl.
  *B60W 30/14* (2006.01)
  *G08G 1/0962* (2006.01)
  *G08G 1/0967* (2006.01)
(52) U.S. Cl.
  CPC ....... *B60W 30/146* (2013.01); *G08G 1/09623* (2013.01); *B60W 2420/42* (2013.01); *B60W 2555/60* (2020.02); *G08G 1/096783* (2013.01)
(58) Field of Classification Search
  CPC .......... G60W 2555/60; G08G 1/09623; G08G 1/096783; B60W 30/143; B60W 30/146; B60W 2420/42; B60W 2555/60
  See application file for complete search history.

(56) References Cited

U.S. PATENT DOCUMENTS

| | | | | |
|---|---|---|---|---|
| 2007/0001830 A1* | 1/2007 | Dagci | ................. | B60K 31/185 |
| | | | | 340/438 |
| 2010/0217494 A1* | 8/2010 | Heft | ......................... | B60T 7/22 |
| | | | | 701/70 |
| 2012/0253628 A1* | 10/2012 | Maruyama | .......... | B60W 30/143 |
| | | | | 701/93 |
| 2015/0302747 A1* | 10/2015 | Ro | ................... | G08G 1/096783 |
| | | | | 340/905 |
| 2016/0257295 A1* | 9/2016 | Miller | ............... | B60W 50/0097 |
| 2016/0355182 A1* | 12/2016 | Remillard | .......... | G01C 21/3415 |
| 2017/0001522 A1 | 1/2017 | Mochizuki et al. | | |
| 2018/0079410 A1* | 3/2018 | Yamashita | .......... | B60W 30/146 |
| 2020/0050209 A1* | 2/2020 | Bai | .................... | G01C 21/3492 |
| 2020/0191603 A1* | 6/2020 | Zhang | ................. | G08G 1/0129 |
| 2020/0193194 A1* | 6/2020 | Zhang | ................. | B60W 50/0098 |
| 2020/0353922 A1* | 11/2020 | Lee | .................... | B60W 30/143 |

FOREIGN PATENT DOCUMENTS

| | | | | |
|---|---|---|---|---|
| JP | 2014126962 A | * | 7/2014 | ............... G08G 1/09 |
| JP | 2017-94790 A | | 6/2017 | |
| KR | 10-2012-0079341 A | | 7/2012 | |
| KR | 10-2019-0068686 A | | 6/2019 | |

* cited by examiner

APPARATUS FOR ASSISTING DRIVING OF HOST VEHICLE AND METHOD FOR ASSISTING DRIVING OF HOST VEHICLE

CROSS-REFERENCE TO RELATED APPLICATION

This application is based on and claims priority under 35 U.S.C. § 119 to Korean Patent Application No. 10-2020-0052047, filed on Apr. 29, 2020 in the Korean Intellectual Property Office, the disclosure of which is incorporated herein by reference.

BACKGROUND

1. Technical Field

The present disclosure relates to an apparatus for assisting driving of a host vehicle, and more particularly, to an apparatus for assisting driving of a host vehicle and a method for assisting driving of a host vehicle capable of adjusting the driving speed of a vehicle.

2. Description of the Related Art

Vehicles are the most common means of transportation in modern society, and the number of people using them is increasing. Due to the development of vehicle technology, long-distance movement is easy and life is easier. However, in places with a high population density, road traffic conditions deteriorate and traffic congestion often occurs.

Recently, there have been active studies on a vehicle equipped with an advanced driver assist system (ADAS), which actively provides information about the state of a vehicle, the state of a driver, and the surrounding environment to reduce the burden on the driver while enhancing the convenience of the driver.

As an example of an advanced driver assistance device mounted on a vehicle, the cruise control system can control the vehicle to drive at a speed set by the driver or control the vehicle to drive while maintaining a certain distance from the preceding vehicle.

If the speed set by the driver exceeds the speed limit or the preceding vehicle drives faster than the speed limit, the vehicle controlled by the cruise control system may be regulated as overspeed.

SUMMARY

For the above reasons, an aspect of the present disclosure is to provide a driver assistance apparatus and a driver assisting method capable of adjusting the speed of a vehicle depending on an enforcement sign.

Therefore, it is an aspect of the present disclosure to provide an apparatus for assisting driving of a host vehicle, the apparatus including: a camera mounted on the host vehicle and having a field of view outside of the host vehicle, the camera configured to acquire image data; and a controller configured to: process the image data, identify a speed limit of a road on which the host vehicle is driving and whether there is a speed enforcement for the host vehicle based on the image data; and provide information about the speed limit of the road to a driver of the host vehicle based on the speed limit of the road and whether there is the speed enforcement for the host vehicle.

It is an aspect of the present disclosure to provide a method for assisting driving of a host vehicle, the method including: acquiring image data by a camera mounted on the host vehicle and having a field of view outside of the host vehicle; processing the image data by a processor; identifying a speed limit of a road on which the host vehicle is driving and whether there is a speed enforcement for the host vehicle in response to processing the image data; and providing information about the speed limit of the road to a driver of the host vehicle based on the speed limit of the road and whether there is the speed enforcement for the host vehicle.

It is an aspect of the present disclosure to provide an apparatus for assisting driving of a host vehicle, the apparatus including: a camera mounted on the host vehicle and having a field of view outside of the host vehicle, the camera configured to acquire image data; and a controller configured to: process the image data, control a driving system or a braking system of the host vehicle at a set speed set by a driver, identify a speed limit of a road on which the host vehicle is driving and whether there is a speed enforcement for the host vehicle based on the image data; and control the driving system or the braking system of the host vehicle to decrease the driving speed of the host vehicle to the speed limit based on the speed limit of the road and whether there is the speed enforcement for the host vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, the principles and embodiments of the disclosure will be described with reference to the accompanying drawings.

Figure 1:
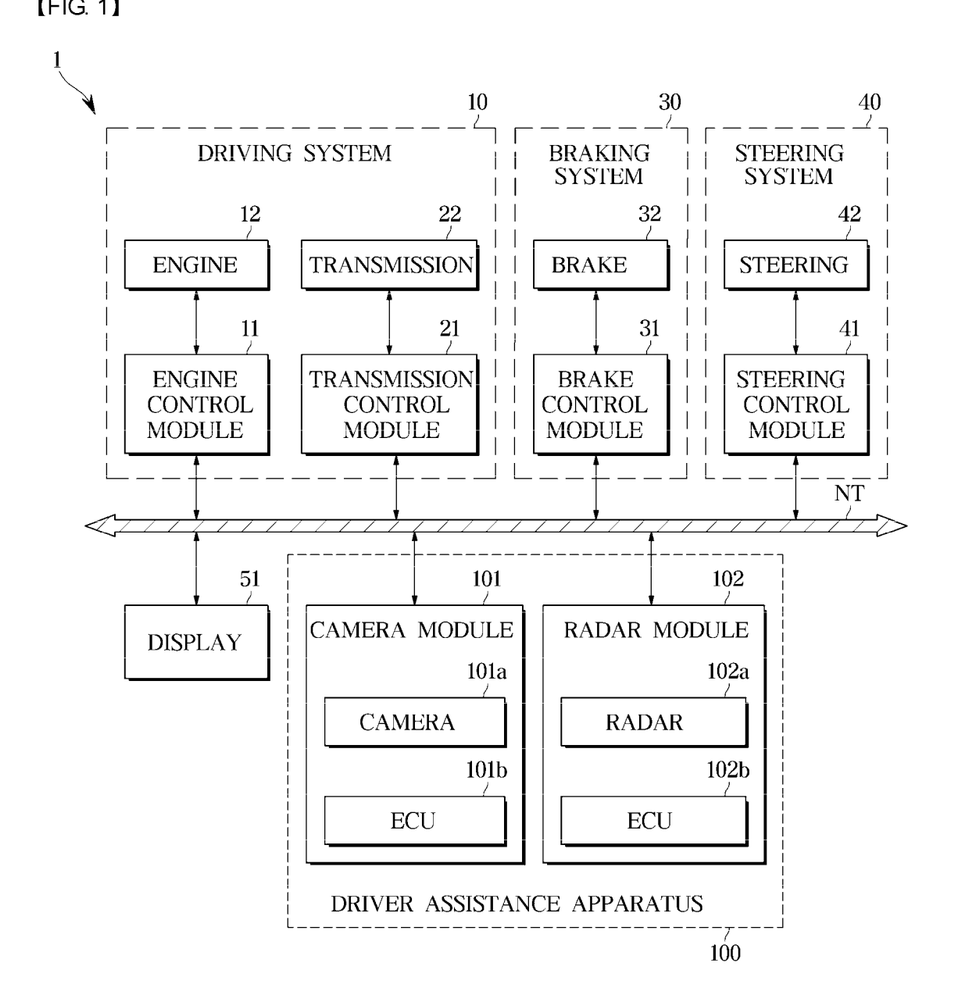
FIG. 1 illustrates a configuration of a vehicle equipped with a driver assistance apparatus according to an embodiment.

FIG. 1 illustrates a configuration of a vehicle equipped with a driver assistance apparatus according to an embodiment.

As shown in FIG. 1, the vehicle 1 includes a driving system 10, a braking system 30 and a steering system 40.

The driving system 10 moves the vehicle 1, and may include an engine 12, an engine control module 11, a transmission 22, and a transmission control module 21.

The engine 12 may generate power for the vehicle 1 to drive by using explosive combustion of fuel. The transmission 22 can reduce the power generated by the engine 12 and transmit it to the wheels.

The engine control module 11 may be electrically connected to the engine 12, and may output a control signal for controlling the engine 12 in response to the drivers willingness to accelerate through the accelerator pedal or a request from the driver assistance apparatus 100.

The engine control module 11 may control the engine 12 in response to a request from the driver assistance apparatus 100. For example, the engine control module 11 may receive an acceleration request including acceleration from the driver assistance apparatus 100 and control the engine 12 so that the vehicle 1 accelerates depending on the received acceleration.

The transmission control module 21 may be fluidly connected to the transmission 22 (for example, through a flow path, etc.), and in response to a shift command of the driver through a shift lever and/or a driving speed of the vehicle 1, can provide hydraulic pressure for controlling the gear level of the transmission 22 to the transmission 22.

The braking system 30 stops the vehicle 1 and may include a brake 32 and a brake control module 31.

The brake 32 may decelerate the vehicle 1 or stop the vehicle 1 through friction with the wheel.

The brake control module 31 is fluidly connected to the brake 32 and may provide hydraulic pressure for controlling the brake 32 to the brake 32 in response to a drivers braking will through a brake pedal and/or a behavior of the vehicle 1.

The brake control module 31 may control the brake 32 in response to a request from the driver assistance apparatus 100. For example, the brake control module 31 receives a deceleration request including a deceleration from the driver assistance apparatus 100 and controls the brake 32 so that the vehicle 1 decelerates depending on the requested deceleration.

The steering system 40 may include a steering 42 and a steering control module 41.

The steering 42 may change the driving direction of the vehicle 1.

The steering control module 41 is connected to the steering 42 mechanically (for example, through gears) or fluidly, and may assist the operation of the steering 42 so that the driver can easily manipulate the steering wheel in response to the drivers will to steer through the steering wheel.

The steering control module 41 may control the steering 42 in response to a request from the driver assistance apparatus 100. For example, the steering control module 41 receives a steering request including a steering torque from the driver assistance apparatus 100 and may control the steering 42 so that the vehicle 1 is steered depending on the requested steering torque.

The vehicle 1 further includes a display device 51 and a driver assistance apparatus 100 for driver safety and convenience.

The display device 51 may display an image for providing convenience and information to the driver. The display device 51 may display information requested from the driver assistance apparatus 100. For example, the display device 51 may display information on a speed limit of a road in response to a request from the driver assistance apparatus 100.

The driver assistance apparatus 100 may assist the driver in manipulating (driving, braking, and steering) the vehicle 1. For example, the driver assistance apparatus 100 may sense a surrounding environment of the vehicle 1 (e.g., another vehicle, a pedestrian, a cyclist, a lane, a road sign, and the like), and control driving and/or braking and/or steering of the vehicle 1 in response to the sensed environment.

The driver assistance apparatus 100 may provide the driver with various functions. For example, the driver assistance apparatus 100 may include a lane departure warning (LDW), a lane keeping assist (LKA), a high beam assist (HBA), an automatic emergency braking (AEB), a traffic sign recognition (TSR), a smart cruise control (SCC), a blind spot detection (BSD), and the like.

The driver assistance apparatus 100 includes a camera module 101 that acquires image data of the surrounding of the vehicle 1 and a radar module 102 that acquires object data of the surrounding of the vehicle 1. The camera module 101 may include a camera 101a and an electronic control unit (ECU) 101b, and photograph at least one of the front or the lateral side of the vehicle 1 and recognize another vehicle, a pedestrian, a cyclist, a lane, a road sign, and the like. The radar module 102 may include a radar 102a and an ECU 102b, and acquire a relative location, a relative speed, and the like of an object of the surrounding of the vehicle 1 (e.g., another vehicle, a pedestrian, a cyclists, and the like).

The driver assistance apparatus 100 is not limited to the one shown in FIG. 1, and may further include a LiDAR that scans around the vehicle 1 and detects an object.

The above described electronic components may communicate with each other through vehicle communication network NT. For example, the electronic components may transmit data through controller area network (CAN), local interconnect network (LIN), and the like. For example, the driver assistance apparatus 100 may transmit a driving signal, a braking signal, and a steering signal to the engine control module 11, the transmission control module 21, brake control module 31 and steering control module 41, respectively.

Figure 2:
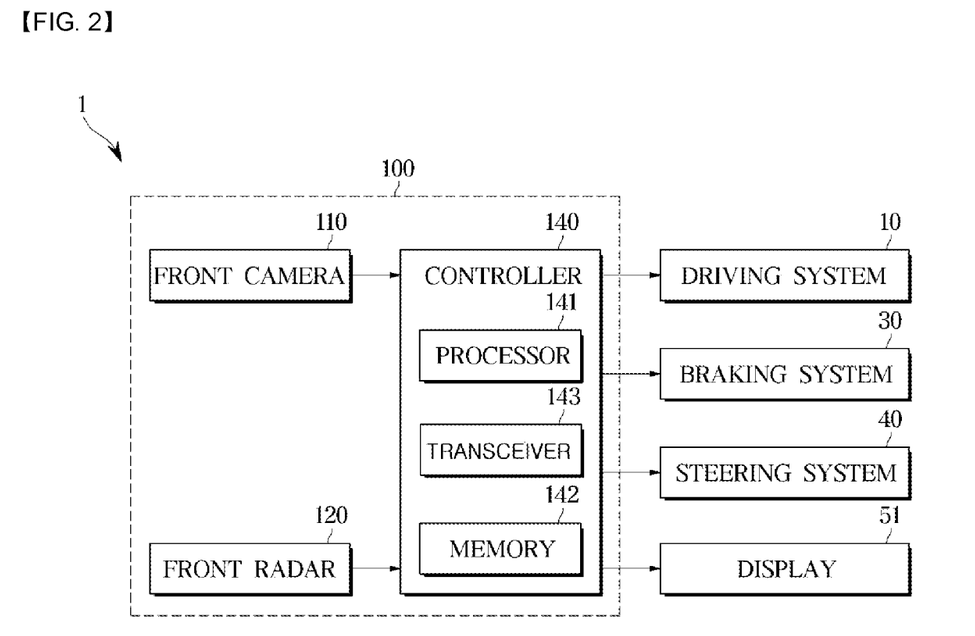
FIG. 2 illustrates the configuration of a driver assistance apparatus according to an embodiment.
Figure 3:
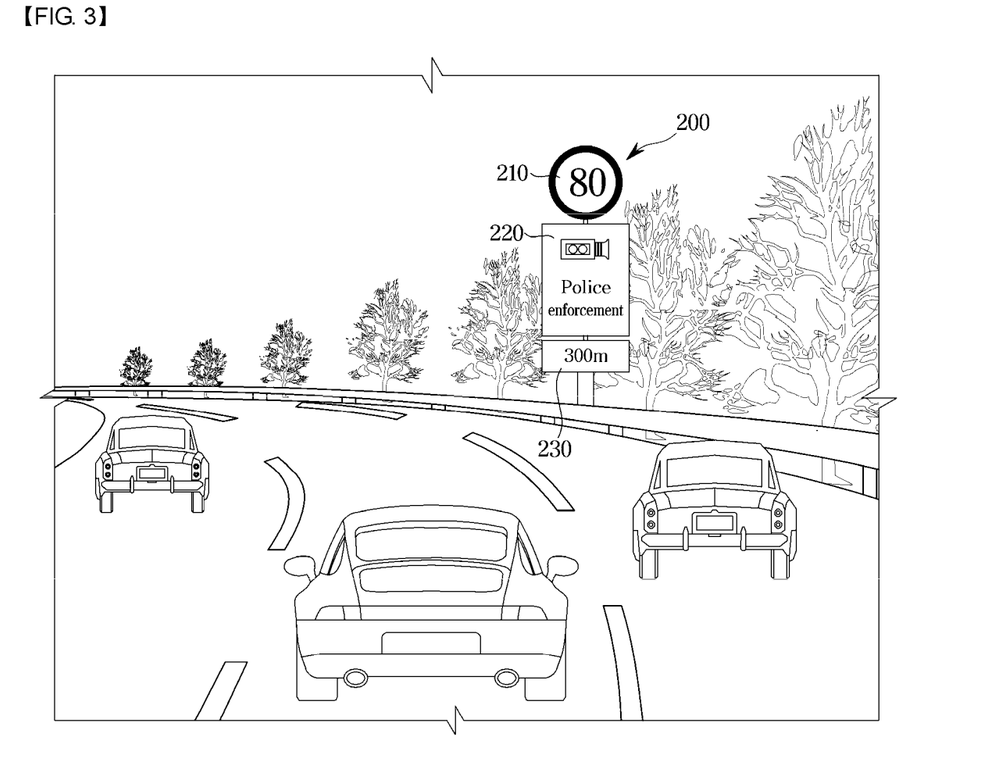
FIG. 3 illustrates an example of a speed limit sign.

FIG. 2 illustrates the configuration of a driver assistance apparatus according to an embodiment. FIG. 3 illustrates an example of a speed limit sign.

As shown in FIG. 2, the vehicle 1 may include a driving system 10, a braking system 30, a steering system 40, a display device 51, and a driver assistance apparatus 100.

The driving system 10, the braking system 30, the steering system 40, and the display device 51 may be the same as the driving system 10, the braking system 30, and the steering system 40 shown in FIG. 1.

The driver assistance apparatus 100 may include a front camera 110, a front radar 120, and a controller 140.

The front camera 110 may have a field of view facing the front of the vehicle 1. The front camera 110 may be mounted on the front windshield of the vehicle 1.

The front camera 110 may photograph the front of the vehicle 1 and acquire image data of the front of the vehicle 1. The image data of the front of the vehicle 1 may include information of another vehicle, a pedestrian, a lane or a sign existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to the controller 140 and may transmit image data in front of the vehicle 1 to the controller 140. For example, the front camera 110 may be connected to the controller 140 through a vehicle communication network NT, a hard wire, or a printed circuit board (PCB).

The front radar 120 may have a field of sensing facing the front of the vehicle 1. The front radar 120 may be mounted, for example, on a grille of the vehicle 1.

The front radar 120 may include a transmission antenna (or a transmission antenna array) and a reception antenna (or a reception antenna array) toward the front of the vehicle 1. The front radar 120 may acquire detection data based on the transmitted radio wave transmitted by the transmitting antenna and the received radio wave received by the receiving antenna. The detection data may include a location (distance and direction) and speed of an object located in front of the vehicle 1.

The front radar 120 may be connected to the controller 140 through a vehicle communication network NT, a hard wire, or a printed circuit board. The front radar 120 may transmit the front radar data to the controller 140.

The controller 140 may include the ECU (101b in FIG. 1) of the camera module (101 in FIG. 1) and/or the ECU (102b in FIG. 1) of the radar module (102 in FIG. 1), and/or an integrated ECU.

The controller 140 may be electrically connected to the front camera 110 and the front radar 120. In addition, the controller 140 may be connected to the driving system 10, the braking system 30, and the steering system 40 through a vehicle communication network NT.

The controller 140 may include a plurality of semiconductor devices, and may be variously called as an Electronic Control Unit (ECU) or the like.

The controller 140 includes a CAN transceiver 143, a memory 142, and a processor 141.

The CAN transceiver 143 may exchange data with the engine control module 11, the transmission control module 21, the brake control module 31, the steering control module 41, and the display device 51 through a vehicle communication network NT.

The memory 142 may store programs and data for controlling the operation of the driver assistance apparatus 100. In addition, the memory 142 may provide programs and data to the processor 141 and store temporary data generated during an operation of the processor 141.

The memory 142 may include a volatile memory, such as an S-RAM, a D-RAM, and the like, and a non-volatile memory, such as a flash memory, a read only memory (ROM), an erasable programmable read only memory (EPROM), and the like. The memory 142 may include one semiconductor device or may include a plurality of semiconductor devices.

The processor 141 may process image data of the front camera 110 and/or detection data of the front radar 120 according to programs and data provided from the memory 142. In addition, the processor 141 may generate control signals for controlling the driving system 10, the braking system 30, and the steering system 40 according to programs and data stored in the memory 142.

The processor 141 may include one semiconductor device or may include a plurality of semiconductors. In addition, the processor 141 may include one core or a plurality of cores in one semiconductor device. Such a processor 141 may be referred to in various ways, such as a Micro Processing Unit (MPU) or the like.

The controller 140 may detect objects (e.g., another vehicle, a pedestrian, a sign, and the like) front of the vehicle 1 based on the front image data of the front camera 110 and the detection data of the front radar 120.

The controller 140 may identify a relative location (distance and direction) and classification (eg, whether the object is another vehicle, a pedestrian, or a sign) of objects in front of the vehicle 1 based on the image data of the front camera 110. The controller 140 may acquire the relative location (distances and directions) and relative speed of objects in front of the vehicle 1 based on the detection data of the front radar 120. In addition, the controller 140 may match objects detected by the image data to objects detected by the detection data, and identify classification, relative location, and relative speed of objects in front of the vehicle 1 based on the matching result.

The controller 140 may generate a driving signal, a braking signal, and a steering signal based on a driver's input and relative location and relative speed of the front objects. For example, the controller 140 may transmit a driving signal for driving the vehicle 1 at a speed set by the driver to the driving system 10. The controller 140 may transmit a driving signal to the driving system 10 so that the distance to the preceding vehicle (or the time until reaching the location of the preceding vehicle) becomes a distance set by the driver. The controller 140 determines a time to collision (TTC) or a distance to collision (DTC) between the vehicle 1 and the front object based on the location (distance) and the relative speed of the front object, and warns the driver of a collision or transmits a braking signal to the braking system 32 based on a result of comparing the TTC with a reference value.

The controller 140 may detect a sign in front of the vehicle 1 and identify the contents of the sign. For example, the controller 140 may detect a sign based on the color and/or shape of the sign. In addition, the controller 140 may identify the content of the sign using a machine-learned recognition module.

Signs may have a specific shape with a specific color. As shown in FIG. 3, the speed limit sign may have a red annular shape. The controller 140 may detect a specific shape (eg, an annular shape) in a specific color area (eg, a red area).

When a sign is detected, the controller 140 may determine the speed limit of the road by identifying a number or letter in the sign. In addition, the controller 140 may determine road information (eg, a school zone) by identifying a shape in the sign.

The controller 140 may detect, for example, a composite sign including various pieces of information. For example, as shown in FIG. 3, the enforcement notice sign 200 may include a first sign 210 indicating speed limit, a second sign 220 indicating speed enforcement, and a third sign 230 indicating the distance to the enforcement location.

The controller 140 may detect each of the first sign 210, the second sign 220, and the third sign 230. For example, the controller 140 may detect the first sign 210 indicating the speed limit, and then detect the second sign 220 and the third sign 230 in the vicinity of the first sign 210.

The controller 140 may identify the content of the first sign 210 and the content of the second sign 220 and the content of the third sign 230. The controller 140 may identify the speed limit of the road from the first sign 210. The controller 140 may identify speed enforcement from the second sign 220. The controller 140 may identify the distance from the third sign 230 to the speed enforcement location.

As such, the controller 140 can determine the speed limit and distance to the speed enforcement location of the road based on the enforcement notice sign 200 including the first sign 210, the second sign 220 and the third sign 230.

The controller 140 may provide a path for preventing speeding to the driver or limit the driving speed of the vehicle 1 based on the speed limit and the distance to the speed enforcement location of the road. For example, when the cruise control for controlling the vehicle 1 to drive at a speed set by the driver is activated, the controller 140 may limit the driving speed of the vehicle 1 to the speed limit of the road.

Figure 4:
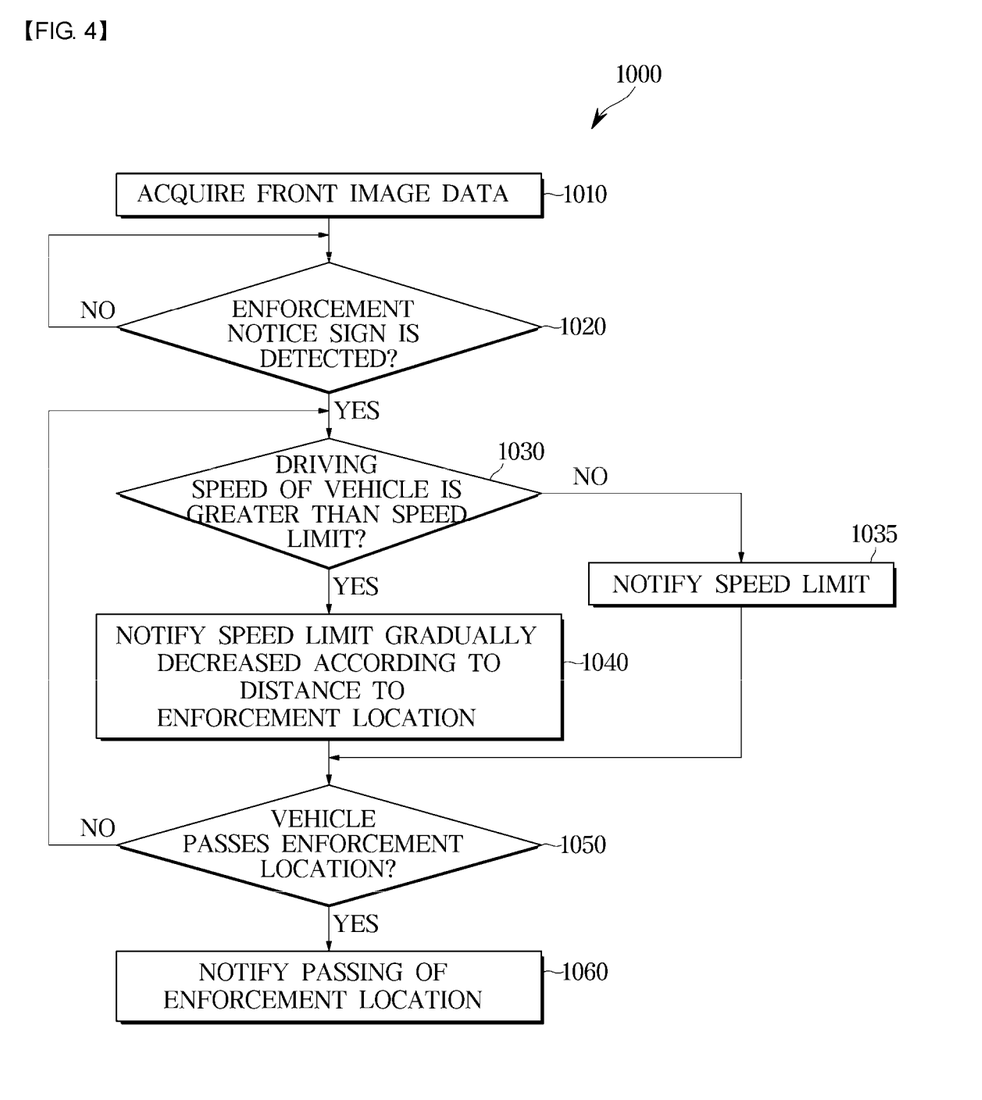
FIG. 4 illustrates the operation of a driver assistance apparatus according to an embodiment.
Figure 5:
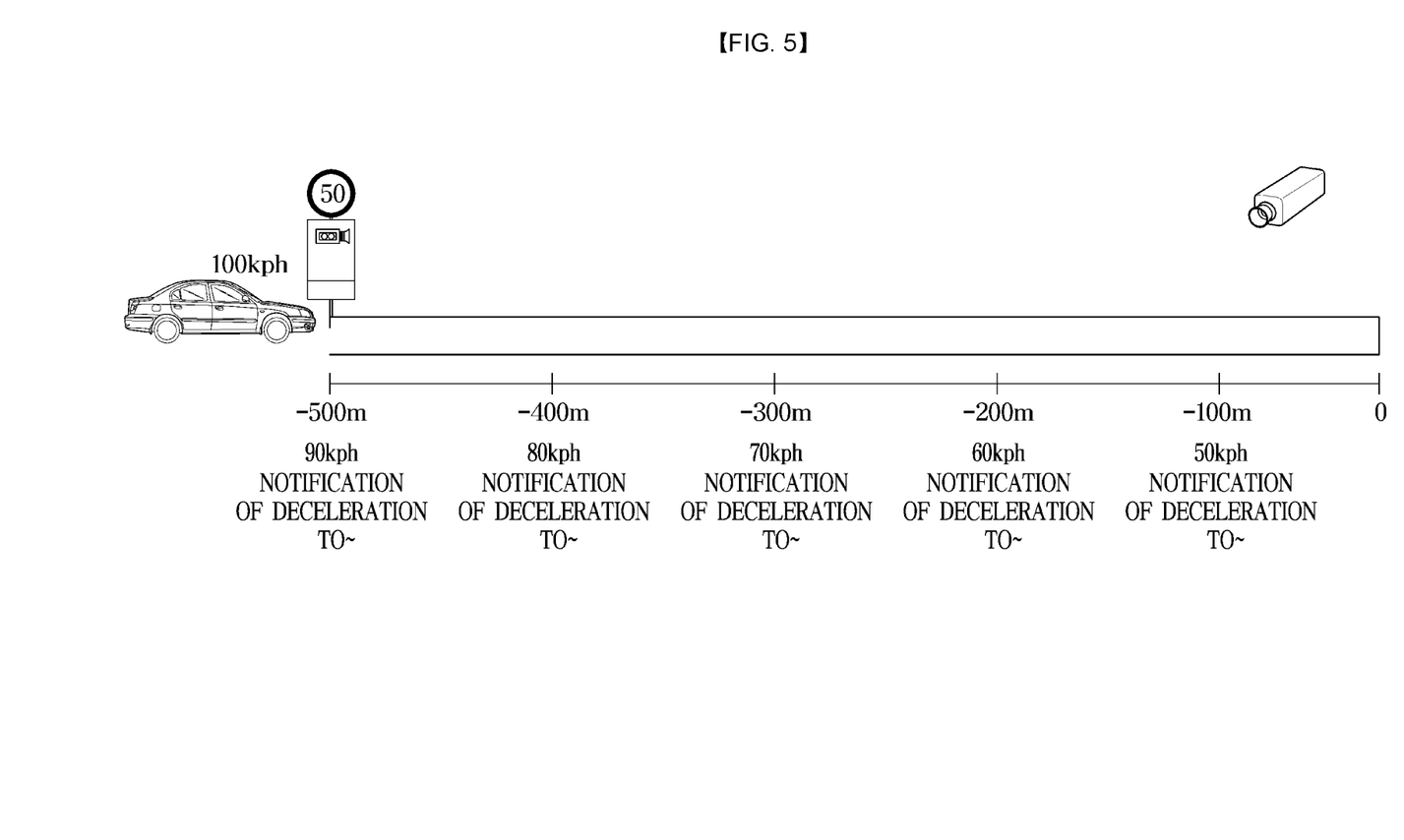
FIG. 5 illustrates an example of providing a notification to a driver according to the operation of the driver assistance apparatus shown in FIG. 4.

FIG. 4 illustrates the operation of a driver assistance apparatus according to an embodiment. FIG. 5 illustrates an example of providing a notification to a driver according to the operation of the driver assistance apparatus shown in FIG. 4.

Referring to FIGS. 4 and 5, the operation 1000 of the driver assistance apparatus 100 will be described.

The driver assistance apparatus 100 acquires image data in front of the vehicle 1 (1010).

While the vehicle 1 is driving, the front camera 110 may photograph the front of the vehicle 1 and acquire image data in front of the vehicle 1. In addition, the front camera 110 may provide the acquired image data to the controller 140.

For example, the front camera 110 may acquire image data including the enforcement notice sign 200 and may provide image data including the enforcement notice sign 200 to the controller 110.

The driver assistance apparatus 100 determines whether the enforcement notice sign 200 is detected (1020).

The controller 140 may receive image data from the front camera 110 and process the received image data. The controller 140 may include an image processor for processing image data.

For example, the controller 140 may search for a sign from image data. The controller 140 may search for a specific shape in a color area of a specific color. For example, the controller 140 may search for an annular shape in a red color area to search for a speed limit sign. Thereby, the controller 140 may detect the first sign 210 indicating the speed limit.

When the first sign 210 is detected, the controller 140 may search for a specific shape in a color area of a specific color around the first sign 210 again. For example, the controller 140 may search for a rectangle in a yellow color area to search for speed enforcement signs. Thereby, the controller 140 can detect the second sign 220 indicating speed enforcement.

When the second sign 220 is detected, the controller 140 may search for a specific shape in a color area of a specific color around the second sign 220 again. For example, the controller 140 may search for a rectangle in a white color area. Thereby, the controller 140 can detect the third sign 230 indicating the speed enforcement location.

As such, the controller 140 may detect the enforcement notice sign 200 based on the image data acquired from the front camera 110.

If it is determined that the enforcement notice sign 200 has not been detected (No in 1020), the driver assistance apparatus 100 may continue image processing to detect the speed enforcement sign.

When it is determined that the enforcement notice sign 200 is detected (Yes in 1020), the driver assistance apparatus 100 determines whether the driving speed of the vehicle 1 is greater than the speed limit (1030).

If a sign is detected, the controller 140 may identify the contents of the sign. The controller 140 may identify the content of the sign using a machine-learned recognition program module or may identify the content of the sign using a feature extraction algorithm.

For example, if the first sign 210 is detected, the controller 140 may recognize the content of the first sign 210. In other words, the controller 140 may identify a number representing the speed limit on the first sign 210. If the second sign 220 is detected, the controller 140 may identify the content of the second sign 220. In other words, the controller 140 may detect a sign or letter indicating speed enforcement in the second sign 220. If the third sign 230 is detected, the controller 140 may identify the content of the third sign 230. In other words, the controller 140 may identify a number representing the distance from the third sign 230 to the speed enforcement location.

Once the contents of the enforcement notice sign 200 are identified, the controller 140 may determine whether the driving speed of the vehicle 1 is greater than the identified speed limit of the enforcement notice sign 200. If information about the driving speed of the vehicle 1 may be received from the driving system 10 or the braking system 30, the controller 140 may compare the driving speed of the vehicle 1 with the identified speed limit of the enforcement notice sign 200.

If it is determined that the driving speed of the vehicle 1 is not greater than the speed limit (No in 1030), the driver assistance apparatus 100 notifies the driver of the speed limit (1035).

For example, the controller 140 may transmit information about the speed limit to the display device 51 to display the speed limit to the driver. The speed limit of the road may be displayed on the display device 51 so that the vehicle 1 does not speed up.

When it is determined that the driving speed of the vehicle 1 is greater than the speed limit (Yes in 1030), the driver assistance apparatus 100 notifies that the speed limit has gradually decreased according to the distance to the enforcement location (1040).

When it is determined that the driving speed of the vehicle 1 is greater than the speed limit, the controller 140 may determine the difference between the driving speed and the speed limit of the vehicle 1 and determine whether the determined difference is greater than the reference difference.

If the determined difference is not greater than the reference difference, the controller 140 may transmit information about the speed limit to the display device 51 to display the speed limit to the driver. The speed limit of the road may be displayed on the display device 51 so that the vehicle 1 is not regulated due to speeding.

In addition, an image effect may be displayed so that the driver may recognize that the driving speed of the vehicle 1 is greater than the speed limit. For example, an image displayed on the display device 51 may blink or an image indicating a speed limit may partially blink.

If the determined difference is greater than the reference difference, the controller 140 may transmit information about the speed limit to the display device 51 to display the speed limit gradually decreased according to the distance remaining to the enforcement location. Specifically, the controller 140 may transmit information about the speed limit to the display device 51 to display the decreased speed limit as the distance to the enforcement location decreases. Thereby, the driver may decrease the driving speed of the vehicle 1 gradually or stepwise until the vehicle 1 reaches the enforcement location.

For example, as shown in FIG. 5, the vehicle 1 drives at a speed of 100 kph (km per hour), the speed limit of the road may be 50 kph, and the distance to the enforcement location may be 500 m.

Once the enforcement notice sign 200 is identified, the controller 140 may transmit information about the speed limit to the display device 51 to indicate a speed limit of 90 kph.

While the vehicle 1 is driving, the controller 140 may determine the driving distance of the vehicle 1. If the distance to the enforcement location based on the driving distance of the vehicle 1 is 400 m or less, the controller 140 may transmit information about the speed limit to the display device 51 to display the speed limit of 80 kph. If the distance to the enforcement location based on the driving distance of the vehicle 1 is 300 m or less, the controller 140 may transmit information about the speed limit to the display device 51 to display the speed limit of 70 kph. If the distance to the enforcement location based on the driving distance of the vehicle 1 is 200 m or less, the controller 140 may transmit information about the speed limit to the display device 51 to display the speed limit of 60 kph. In addition, if the distance to the enforcement location based on the driving distance of the vehicle 1 is 100 m or less, the controller 140 may transmit information about the speed limit to the display device 51 to display the speed limit of 50 kph.

If the difference between the driving speed of the vehicle 1 and the driving speed of the road is large, when a speed limit is displayed to the driver, the driver may forcefully decrease the speed of the vehicle 1. As a result, there is a risk of a collision of a vehicle following the vehicle 1. On the other hand, by displaying the speed limit gradually decreased according to the distance to the enforcement location, the driver assistance apparatus 100 may induce the driver to slow down the vehicle 1 gradually. Thereby, an accident due to the rapid deceleration of the vehicle 1 may be prevented.

However, inducing the driver assistance apparatus 100 to decrease the driving speed of the vehicle 1 is not limited to inducing the vehicle 1 to gradually decrease the driving speed. For example, the driver assistance apparatus 100 may transmit information about the speed limit to the display device 51 so that the speed limit decreased in proportion to the distance to the enforcement location is displayed.

The driver assistance apparatus 100 determines whether the vehicle 1 has passed the enforcement location (1050).

After identifying the enforcement notice sign 200, while the vehicle 1 is driving, the controller 140 may determine the driving distance of the vehicle 1. In other words, the controller 140 may determine the distance from the enforcement notice sign 200 to the vehicle 1. If the distance from the enforcement notice sign 200 to the vehicle 1 is greater than or equal to the distance to the enforcement location disclosed in the enforcement notice sign 200, the controller 140 may determine that the vehicle 1 has passed the enforcement location.

After identifying the enforcement notice sign 200, while the vehicle 1 is driving, the controller 140 may acquire image data from the front camera 110 and search the enforcement camera or speed enforcement sign from the image data. For example, the controller 140 searches for a speed enforcement sign indicating speed enforcement on the upper or right side in front of the vehicle 1 based on the image data, when a speed enforcement sign is detected on the upper or right side in front of the vehicle 1, the controller 140 may determine that the vehicle 1 has passed the enforcement location.

If it is determined that the vehicle 1 has not passed the enforcement location (No in 1050), the driver assistance apparatus 100 may repeat determining whether the driving speed of the vehicle 1 is greater than the speed limit.

If it is determined that the vehicle 1 has passed the enforcement location (Yes in 1050), the driver assistance apparatus 100 notifies the driver of the passing of the enforcement location (1060).

The controller 140 may transmit a control signal to the display device 51 to display an image indicating that the vehicle 1 has passed the enforcement location.

As described above, the driver assistance apparatus 100 may identify the enforcement notice sign 200 based on the image data in front of the vehicle 1, and may provide the driver with a speed limit that is gradually decreased based on the speed limit indicated on the enforcement notice sign 200 and the distance to the enforcement location. Thereby, the vehicle 1 is prevented from overspeeding in the speed enforcement section, and an accident due to the rapid deceleration of the vehicle 1 may be prevented.

In the above, the navigation device of the vehicle 1 is not mentioned. Unlike the above description, when the vehicle 1 includes a navigation device, the driver assistance apparatus 100 may acquire information about an enforcement location that regulates speeding of the vehicle 1 from the navigation device. If the distance from the navigation device to the enforcement location is less than the reference distance, the driver assistance apparatus 100 may inform the driver of a speed limit that is gradually decreased according to the distance to the enforcement location.

In addition, even if the vehicle 1 includes a navigation device, if the navigation device fails, the driver assistance apparatus 100 may detect the enforcement notice sign 200 based on the image data in front of the vehicle 1 and determine the distance to the enforcement location, and may inform the driver of the speed limit gradually being decreased according to the distance to the enforcement location.

In other words, in the case of a vehicle 1 equipped with a navigation device, the driver assistance apparatus 100 may inform the driver of the speed limit gradually decreased according to the distance to the enforcement location based on the enforcement location output from the navigation device. And if the navigation device fails, the driver assistance apparatus 100 may notify the driver of a speed limit that is gradually being decreased according to the distance to the enforcement location based on the enforcement notice sign 200.

Figure 6:
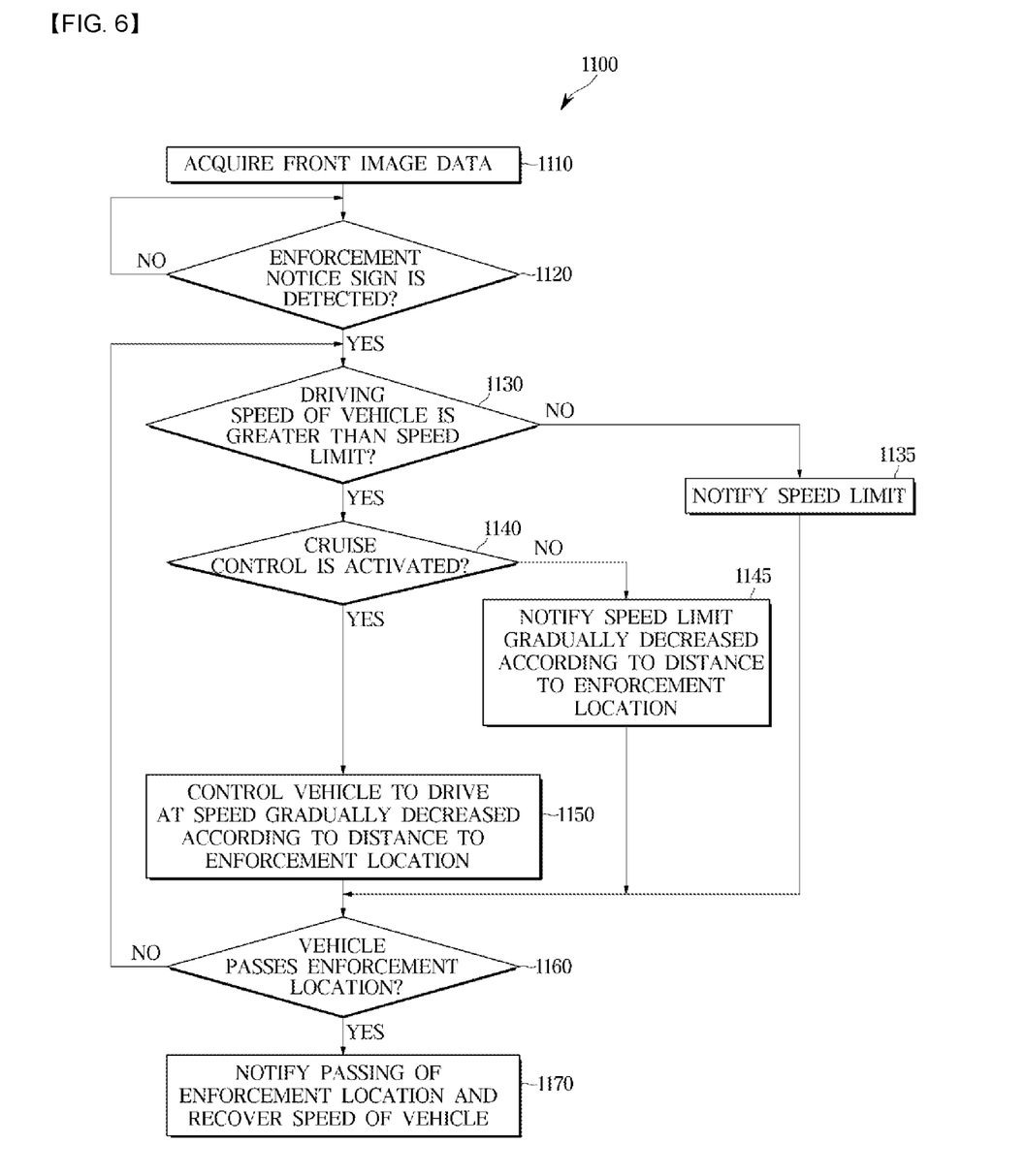
FIG. 6 illustrates the operation of a driver assistance apparatus according to an embodiment.
Figure 7:
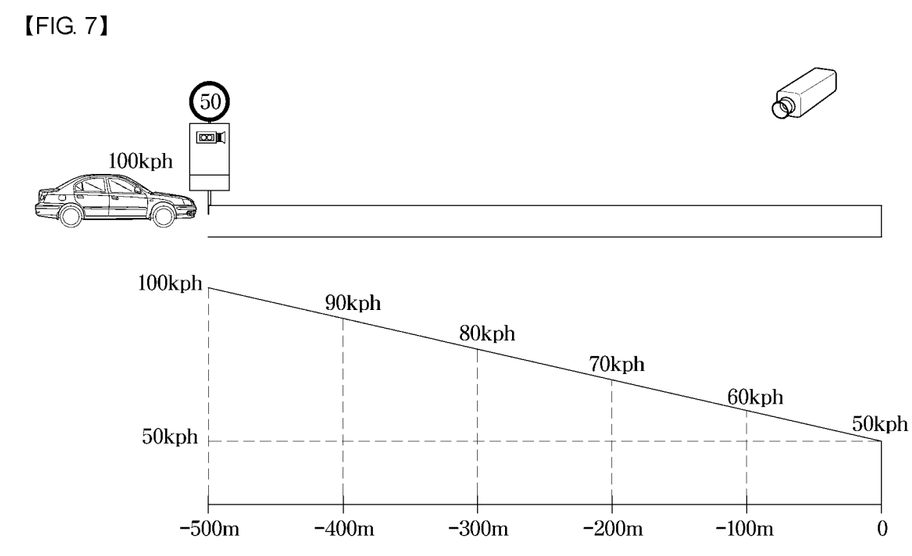
FIG. 7 illustrates an example of limiting the speed of a vehicle according to the operation of the driver assistance apparatus shown in FIG. 6.

FIG. 6 illustrates the operation of a driver assistance apparatus according to an embodiment. FIG. 7 illustrates an example of limiting the speed of a vehicle according to the operation of the driver assistance apparatus shown in FIG. 6.

Referring to FIGS. 6 and 7, the operation 1100 of the driver assistance apparatus 100 is described.

The driver assistance apparatus 100 acquires image data in front of the vehicle 1 (1110). The driver assistance apparatus 100 determines whether an enforcement notice sign 200 is detected (1120). If it is determined that the enforcement notice sign 200 has not been detected (No in 1120), the driver assistance apparatus 100 may continue image processing to detect the speed enforcement sign. When it is determined that the enforcement notice sign 200 has been detected (Yes in 1120), the driver assistance apparatus 100 determines whether the driving speed of the vehicle 1 is greater than the speed limit (1130). If it is determined that the driving speed of the vehicle 1 is not greater than the speed limit (No in 1130), the driver assistance apparatus 100 notifies the driver of the speed limit (1135).

The operation 1110, operation 1120, operation 1130, and operation 1135 may be the same as operations 1010, 1020, 1030, and 1035 shown in FIG. 4.

When it is determined that the driving speed of the vehicle 1 is greater than the speed limit (Yes in 1130), the driver assistance apparatus 100 determines whether the cruise control of the vehicle 1 is activated (1140).

The cruise control includes controlling the vehicle 1 to drive at a driving speed set by the driver and controlling the vehicle 1 to follow and maintain a constant distance from the preceding vehicle selected by the driver.

The driver may set the driving speed for cruise control through, for example, a button provided on the steering wheel or the center fascia. The driver assistance apparatus 100 may transmit an acceleration signal or a deceleration signal to the driving system 10 or the braking system 30 so that the vehicle 1 drives at a driving speed set by the driver.

In addition, the driver may set the distance to the preceding vehicle for cruise control through, for example, a button provided on the steering wheel or the center fascia. The driver assistance apparatus 100 may measure a distance to a preceding vehicle based on the output of the front radar 120 and transmit a control signal to the driving system 10 and the braking system 30 so that the vehicle 1 maintains the distance to the preceding vehicle set by the driver.

If it is determined that the cruise control has not been activated (No in 1140), the driver assistance apparatus 100 notifies that the speed limit has gradually decreased according to the distance to the enforcement location (1145).

The operation 1145 may be the same as operation 1040 shown in FIG. 4.

When it is determined that the cruise control is activated (Yes in 1140), the driver assistance apparatus 100 controls the vehicle 1 to drive at a speed gradually decreased according to the distance to the enforcement location. (1150).

When it is determined that the driving speed of the vehicle 1 is greater than the speed limit, the controller 140 may determine whether the difference between the driving speed of the vehicle 1 and the speed limit is greater than the reference difference. If the determined difference is not greater than the reference difference, the controller 140 may transmit an acceleration signal or a deceleration signal to the driving system 10 or the braking system 30 so that the vehicle 1 drives at the speed limit.

If the determined difference is greater than the reference difference, the controller 140 may transmit an acceleration signal or a deceleration signal to the driving system 10 or the braking system 30 so that the vehicle 1 drives at a gradually decelerated driving speed according to the remaining distance to the enforcement location. Specifically, the controller 140 may transmit an acceleration signal or a deceleration signal to the driving system 10 or the braking system 30 to drive at a decreased driving speed as the distance to the enforcement location decreases. Thereby, the vehicle 10 may gradually or stepwise decrease the driving speed until it reaches the enforcement location.

For example, as shown in FIG. 7, the vehicle 1 drives at a speed of 100 kph (km per hour), the speed limit of the road may be 50 kph, and the distance to the enforcement location may be 500 m.

Once the enforcement notice sign 200 is identified, the controller 140 may transmit a deceleration signal to the driving system 10 or the braking system 30 to decrease the driving speed of the vehicle 1 to 90 kph.

While the vehicle 1 is driving, the controller 140 may determine the driving distance of the vehicle 1, and if the distance to the enforcement location is 400 m or less based on the driving distance of the vehicle 1, the controller 140 may transmit a deceleration signal to the driving system 10 or the braking system 30 to decrease the driving speed of the vehicle 1 to 80 kph. If the distance to the enforcement location is 300 m or less based on the driving distance of the vehicle 1, the controller 140 may transmit a deceleration signal to the driving system 10 or the braking system 30 to decrease the driving speed of the vehicle 1 to 70 kph. If the distance to the enforcement location is 200 m or less based on the driving distance of the vehicle 1, the controller 140 may transmit a deceleration signal to the driving system 10 or the braking system 30 to decrease the driving speed of the vehicle 1 to 60 kph. In addition, if the distance to the enforcement location is 100 m or less based on the driving distance of the vehicle 1, the controller 140 may transmit a deceleration signal to the driving system 10 or the braking system 30 to decrease the driving speed of the vehicle 1 to 50 kph.

If the driving speed of the vehicle 1 is drastically decreased, it causes inconvenience to the driver, and there is a risk of a collision of a vehicle following the vehicle 1. By gradually decreasing the driving speed of the vehicle 1, inconvenience to the driver may be prevented, and an accident due to the rapid deceleration of the vehicle 1 can be prevented.

However, decreasing the driving speed of the vehicle 1 by the driver assistance apparatus 100 is not limited to gradually decreasing the driving speed of the vehicle 1. For example, the driver assistance apparatus 100 transmits an acceleration signal or a deceleration signal to the driving system 10 or the braking system 30 so that the vehicle 1 drives at a driving speed decreased in proportion to the distance to the enforcement location.

In this case, the deceleration of the vehicle 1 may be determined by [Equation 1] or [Equation 2].

$$a = \frac{V_2^2 - V_1^2}{2D}$$ [Equation 1]

Here, a represents the acceleration of the vehicle 1, V1 represents the current speed of the vehicle 1, V2 represents the speed limit, and D represents the distance to the enforcement location.

$$a = \frac{2(D - V_1 T^2)}{T^2}$$ [Equation 2]

Here, a represents the acceleration of the vehicle 1, V1 represents the current speed of the vehicle 1, T represents the time to reach the enforcement location, D represents the distance to the enforcement location.

The driver assistance apparatus 100 determines whether the vehicle 1 has passed the enforcement location (1160).

The operation 1160 may be the same as operation 1050 shown in FIG. 4.

If it is determined that the vehicle 1 has not passed the enforcement location (No in 1160), the driver assistance apparatus 100 may repeat determining whether the driving speed of the vehicle 1 is greater than the speed limit.

If it is determined that the vehicle 1 has passed the enforcement location (Yes in 1160), the driver assistance apparatus 100 notifies the driver of the passing of the enforcement location and recovers the driving speed of the vehicle 1 (1170).

The controller 140 may transmit a control signal to the display device 51 to display an image indicating that the vehicle 1 has passed the enforcement location.

Also, if cruise control is activated, when the vehicle 1 passes the enforcement location, the controller 140 may transmit an acceleration signal or a deceleration signal to the driving system 10 or the braking system 30 so that the vehicle 1 drives at a driving speed set by the driver.

As described above, the driver assistance apparatus 100 may identify the enforcement notice sign 200 based on the image data in front of the vehicle 1, and may gradually decelerate the vehicle 1 based on the speed limit indicated on the enforcement notice sign 200 and the distance to the enforcement location. Thereby, the vehicle 1 is prevented from overspeeding in the speed enforcement section, and an accident due to the rapid deceleration of the vehicle 1 can be prevented.

Exemplary embodiments of the present disclosure have been described above. In the exemplary embodiments described above, some components may be implemented as a "module". Here, the term 'module' means, but not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

According to an aspect of the present disclosure, it is possible to provide a driver assistance apparatus and a driver assisting method capable of adjusting the speed of a vehicle depending on an enforcement sign. Thereby, the vehicle can be prevented from driving in excess of the speed limit.

What is claimed is:

1. An apparatus for assisting driving of a host vehicle, the apparatus comprising:
    a camera mounted on the host vehicle and having a field of view outside of the host vehicle, the camera configured to acquire image data; and
    a controller configured to:
    process the image data,
    identify a first speed limit of a road on which the host vehicle is driving and whether there is a speed enforcement for the host vehicle based on the image data, and
    provide information about the first speed limit of the road to a driver of the host vehicle based on the first speed limit of the road and whether there is the speed enforcement for the host vehicle, and wherein the controller is further configured to:
identify a distance to a location of the speed enforcement for the host vehicle based on the image data,
acquire a driving speed of the host vehicle,
in response to determining that the driving speed is greater than or equal to the first speed limit, determine whether cruise control of the host vehicle is activated, and
in response to determining that the cruise control is activated, control at least one of a driving system or a braking system of the host vehicle to gradually decrease a set speed for the cruise control of the host vehicle, and
wherein the controller is further configured to:
in response to determining that the driving speed is greater than or equal to the first speed limit and the cruise control is not activated, provide the driver with information about a second speed limit gradually decreasing according to the distance to the location of the speed enforcement for the host vehicle.

2. The apparatus of claim 1, wherein the controller is further configured to:
in response to determining that the driving speed is greater than or equal to the first speed limit and the cruise control is not activated, provide the driver with information about the second speed limit gradually decreasing from the driving speed to the first speed limit according to the distance to the location of speed enforcement for the host vehicle.

3. The apparatus of claim 1, wherein the controller is further configured to:
in response to the driving speed being less than the first speed limit, provide the driver with information about the first speed limit of the road on which the host vehicle drives.

4. The apparatus of claim 1, wherein the controller is further configured to:
in response to determining that the driving speed is greater than or equal to the first speed limit, control the at least one of the driving system or the braking system of the host vehicle to decrease the driving speed of the host vehicle.

5. The apparatus of claim 4, wherein the controller is further configured to:
in response to determining that the driving speed is greater than or equal to the first speed limit, control the at least one of the driving system or braking system of the host vehicle to gradually decrease the driving speed of the host vehicle from the driving speed to the first speed limit according to the distance to the location of the speed enforcement for the host vehicle.

6. A method for assisting driving of a host vehicle, the method comprising:
acquiring image data by a camera mounted on the host vehicle and having a field of view outside of the host vehicle;
processing the image data by a processor;
identifying, by the processor, a first speed limit of a road on which the host vehicle is driving and whether there is a speed enforcement for the host vehicle in response to processing the image data; and
providing information about the first speed limit of the road to a driver of the host vehicle based on the first speed limit of the road and whether there is the speed enforcement for the host vehicle, wherein the providing of the information comprises:
identifying a distance to a location of the speed enforcement for the host vehicle based on the image data,
acquiring a driving speed of the host vehicle,
in response to determining that the driving speed is greater than or equal to the first speed limit, determining whether cruise control of the host vehicle is activated, and
in response to determining that the cruise control is activated, controlling at least one of a driving system or a braking system of the host vehicle to gradually decrease a set speed for the cruise control of the host vehicle, and
wherein the providing of the information further comprises:
in response to determining that the driving speed is greater than or equal to the first speed limit and the cruise control is not activated, providing the driver with information about a second speed limit gradually decreasing according to the distance to the location of the speed enforcement for the host vehicle.

7. The method of claim 6, wherein the providing of the driver with the information about the second speed limit gradually decreasing comprises:
in response to determining that the driving speed is greater than or equal to the first speed limit and the cruise control is not activated, providing the driver with information about the second speed limit gradually decreasing from the driving speed to the first speed limit according to the distance to the location of speed enforcement for the host vehicle.

8. The method of claim 6, wherein the providing of the driver with the information about the second speed limit gradually decreasing comprises:
in response to the driving speed being less than the first speed limit, providing the driver with information about the first speed limit of the road on which the host vehicle drives.

9. The method of claim 6, wherein the providing of the information further comprises:
in response to determining that the driving speed is greater than or equal to the first speed limit, controlling the at least one of the driving system or the braking system of the host vehicle to decrease the driving speed of the host vehicle.

10. The method of claim 9, wherein the decreasing of the driving speed of the host vehicle comprises:
in response to determining that the driving speed is greater than or equal to the first speed limit, gradually decreasing, by the processor, the driving speed of the host vehicle from the driving speed to the first speed limit according to the distance to the location of the speed enforcement for the host vehicle.

11. A non-transitory computer-readable storage medium storing computer-readable instructions of the method of claim 6.

12. An apparatus for assisting driving of a host vehicle, the apparatus comprising:
a camera mounted on the host vehicle and having a field of view outside of the host vehicle, the camera configured to acquire image data; and
a controller configured to:
process the image data,
control at least one of a driving system or a braking system of the host vehicle at a set speed set by a driver,
identify a first speed limit of a road on which the host vehicle is driving and whether there is a speed enforcement for the host vehicle based on the image data, and control the at least one of the driving system or the braking system of the host vehicle to decrease a driving speed of the host vehicle to the first speed limit based on the first speed limit of the road and whether there is the speed enforcement for the host vehicle, wherein the controller is further configured to:

identify a distance to a location of the speed enforcement for the host vehicle based on the image data, acquire the driving speed of the host vehicle, in response to determining that the driving speed is greater than or equal to the first speed limit, determine whether cruise control of the host vehicle is activated, and in response to determining that the cruise control is activated, control the at least one of the driving system or the braking system of the host vehicle to gradually decrease a set speed for the cruise control of the host vehicle, and wherein the controller is further configured to:

in response to determining that the driving speed is greater than or equal to the first speed limit and the cruise control is not activated, provide the driver with information about a second speed limit gradually decreasing according to the distance to the location of the speed enforcement for the host vehicle.

13. The apparatus of claim 11, wherein the controller is further configured to:

in response to determining that the driving speed is greater than or equal to the first speed limit, control the at least one of the driving system or the braking system of the host vehicle to gradually decrease the driving speed of the host vehicle according to the distance to the location of the speed enforcement for the host vehicle.

14. The apparatus of claim 13, wherein the controller is further configured to:

in response to determining that the driving speed is less than the first speed limit, provide the driver with information about the first speed limit of the road on which the host vehicle drives.

* * * * *